United States Patent
So et al.

(10) Patent No.: US 8,045,517 B2
(45) Date of Patent: Oct. 25, 2011

(54) METHOD AND APPARATUS FOR TRANSMITTING/RECEIVING DATA IN A COMMUNICATION SYSTEM USING MULTIPLE FREQUENCY BANDS

(75) Inventors: Jae-Woo So, Bucheon-si (KR); June Moon, Seoul (KR); Yong-Seok Kim, Suwon-si (KR); Soon-Young Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 926 days.

(21) Appl. No.: 12/029,224

(22) Filed: Feb. 11, 2008

(65) Prior Publication Data

US 2008/0192719 A1    Aug. 14, 2008

(30) Foreign Application Priority Data

Feb. 9, 2007   (KR) .................. 10-2007-0013784
Feb. 9, 2007   (KR) .................. 10-2007-0013788
Jan. 4, 2008   (KR) .................. 10-2008-0001480

(51) Int. Cl.
    *H04W 4/00* (2009.01)
(52) U.S. Cl. ......................................... 370/329; 370/536
(58) Field of Classification Search .................. None
    See application file for complete search history.

(56) References Cited

U.S. PATENT DOCUMENTS

| 6,571,221 | B1 | 5/2003 | Stewart et al. |
| 7,224,964 | B2 * | 5/2007 | Souissi et al. ............... 455/414.4 |
| 2002/0102987 | A1 * | 8/2002 | Souisse et al. ................ 455/454 |
| 2007/0121567 | A1 * | 5/2007 | Venkatachalam et al. .... 370/343 |
| 2008/0187136 | A1 * | 8/2008 | Zhang et al. .................. 380/270 |

FOREIGN PATENT DOCUMENTS

| JP | 11-088439 | 3/1999 |
| KR | 1020040053849 | 6/2004 |
| WO | WO 97/08838 | 3/1997 |

* cited by examiner

*Primary Examiner* — Robert Scheibel
(74) *Attorney, Agent, or Firm* — The Farrell Law Firm, P.C.

(57) ABSTRACT

A method for transmitting/receiving data in a communication system using multiple frequency bands. The transmission method includes fragmenting a desired transmission Service Data Unit (SDU) in units of Packet Data Units (PDUs); and transmitting the fragmented PDUs over at least two frequency bands among the multiple frequency bands. Each of the multiple frequency bands is supported by a system having backward compatibility with a legacy system. The reception method includes decrypting a wireless resource (MAP) allocated separately for each of the frequency bands to extract fragment information therefrom; and receiving PDUs over the frequency bands separately, and restoring the SDU according to fragment information corresponding to the corresponding frequency band.

17 Claims, 15 Drawing Sheets

METHOD AND APPARATUS FOR TRANSMITTING/RECEIVING DATA IN A COMMUNICATION SYSTEM USING MULTIPLE FREQUENCY BANDS

PRIORITY

This application claims priority under 35 U.S.C. §119(a) to a Korean Patent Application filed in the Korean Intellectual Property Office on Feb. 9, 2007 and assigned Serial No. 2007-13784, a Korean Patent Application filed in the Korean Intellectual Property Office on Feb. 9, 2007 and assigned Serial No. 2007-13788, and a Korean Patent Application filed in the Korean Intellectual Property Office on Jan. 4, 2008 and assigned Serial No. 2008-1480, the contents of which are incorporated herein by reference.

BACKGROUND OF THE INVENTION

1. Field of the Invention

The present invention relates to a method and apparatus for transmitting/receiving data over multiple frequency bands in a communication system having backward compatibility with the existing systems.

2. Description of the Related Art

The communication systems are evolving by modifying standards of the existing systems to provide higher-speed data services, or by simplifying the existing systems while solving implementation issues. For example, the Code Division Multiple Access (CDMA) system has evolved from CDMA 1× into EVolution Data Only (EV-DO). In the process where the evolution between systems is made in this way, a situation may occur where it is necessary to support both the communication systems before and after the evolution. Further, in this situation, in order to maximize the capacity while making the evolution, it is necessary not only to modify the system standards but also to use additional frequency bands.

FIG. 1 illustrates distribution of frequency bands of a CDMA 1× system and an EV-DO system in a communication system according to the prior art.

Referring to FIG. 1, the communication system includes a CDMA 1× system 102 and an EV-DO system 104, both of which use different resources, and further includes a CDMA 1× system-only terminal 110 supporting only the band-1 106 which is an operation frequency band of the CDMA 1× system 102, an EV-DO system-only terminal 114 supporting only the band-2 108 which is an operation frequency band of the EV-DO system 104, and a switching terminal 112 supporting both the CDMA 1× system 102 and the EV-DO system 104. That is, the CDMA 1× system 102 and the EV-DO system 104 use different frequency bands 106 and 108 independently.

The phrase 'the switching terminal 112 supporting both the CDMA 1× system 102 and the EV-DO system 104' means that the switching terminal 112 can switch to any one of the CDMA 1× system 102 and the EV-DO system 104 rather than simultaneously accessing the two systems 102 and 104, to receive a service therefrom.

Like the CDMA system described above, the IEEE 802.16e system can also expect its system evolution. In this case, the evolved systems can be classified into the existing IEEE 802.16e system ("legacy system") and a system ("BC system") having Backward Compatibility (BC) with the legacy system.

One service provider, while providing the IEEE 802.16e service using an arbitrary frequency band, can upgrade the legacy system to the BC system for the purpose of performance improvement to meet the need for capacity increase, and can also build another BC system in another arbitrary frequency band, as shown in FIGS. 2 and 3.

FIG. 2 illustrates an example of frequency bands for multiple systems having backward compatibility according to the prior art.

Referring to FIG. 2, a band-1 200 is a service frequency band of a legacy system, and a band-2 202 is a service frequency band of a BC system. In this case, while a legacy terminal 204 can make communication only over the band-1 200, a BC terminal 206 can make communication over both the band-1 200 and the band-2 202.

FIG. 3 illustrates another example of frequency bands for multiple systems having backward compatibility according to the prior art.

Referring to FIG. 3, a band-1 300 is a service frequency band of a BC1 system, and a band-2 302 is a service frequency band of a BC2 system. Similarly, while a legacy terminal 304 can perform communication only over the band-1 300, a BC terminal 306 can perform communication over both the band-1 300 and the band-2 302.

FIG. 4 illustrates an operation in which multiple Packet Data Units (PDUs) fragmented from a Service Data Unit (SDU) packet are transmitted over the same band according to the prior art. It is assumed herein that a base station 410 uses a band-1 and a band-2 as its operation frequency bands (or service frequency bands), a terminal 420 can perform transmission/reception over both the band-1 and the band-2, and the band-1 and the band-2 each can support both the legacy and BC systems.

Referring to FIG. 4, the communication system fragments one SDU 400 into a plurality of PDUs, i.e., PDU-A 402, PDU-B 404, and PDU-C 406. The PDU-A 402, PDU-B 404 and PDU-C 406 are transmitted to the terminal 420 only over the same band, i.e., over any one of the band-1 and the band-2, regardless of the supportable service. That is, the terminal 420 and the base station 410 can communicate with each other over both the band-1 and the band-2.

However, the prior art base station 410 transmits the PDU-A 402, PDU-B 404 and PDU-C 406 only over one band regardless of the supportable service, causing a waste of wireless resources.

FIG. 5 illustrates a method in which PDUs fragmented from one SDU are transmitted over different bands in multiple communication systems according to the prior art. It is assumed herein that the communication systems are IEEE 802.16e systems.

Referring to FIG. 5, a base station 502 allocates Down Link (DL) resources and Up Link (UL) resources in a DL frame and/or a UL frame using a MAP Information Element (MAP-IE). The base station 502 has a band-1 and a band-2 as its operation frequency bands, and the PDU(s) transmitted in the band-1 and the PDU(s) transmitted in the band-2 are independent of each other. A terminal 512 can transmit/receive data over both the band-1 and the band-2.

The base station 502 fragments the data (SDU) 500 to be transmitted to the terminal 512 into a PDU-A-1 506 and a PDU-A-2 510. To transmit the PDU-A-1 506 and the PDU-A-2 510 to the terminal 512, the base station 502 allocates DownLink MAPs (DL_MAPs) 504 and 508 to the band-1 and the band-2, respectively. Thereafter, the base station 502 transmits the PDU-A-1 506 over the band-1, and transmits the PDU-A-2 510 over the band-2, thereby transmitting the SDU 500 to the terminal 512.

As described above, upon receipt of a PDU(s), the prior art base station allocates resources over a band-1 and/or a band-2, and transmits the PDU over the allocated DL resource regions. In this case, the PDU transmitted in the band-1 and the PDU transmitted in the band-2 are independent of each other. Therefore, the terminal 512 cannot perceive that PDUs of a same SDU, received from the base station over different bands, belong to the same SDU, so it cannot reassemble the received PDUs.

SUMMARY OF THE INVENTION

An aspect of the present invention is to address at least the problems and/or disadvantages and to provide at least the advantages described below. Accordingly, an aspect of the present invention is to provide a method and apparatus for transmitting/receiving a packet over different frequency bands when there are multiple systems having backward compatibility, thereby improving efficiency of wireless resources through resource sharing between frequency bands.

Another aspect of the present invention is to provide a method and apparatus for allowing a base station to add inter-frequency band packet fragment information to packet header information, thereby transmitting/receiving the corresponding packet over different frequency bands after fragmentation.

According to one aspect of the present invention, there is provided a method for transmitting data in a communication system using multiple frequency bands. The method includes fragmenting a desired transmission Service Data Unit (SDU) in units of Packet Data Units (PDUs); and transmitting the fragmented PDUs over at least two frequency bands among the multiple frequency bands.

According to another aspect of the present invention, there is provided a method for receiving a packet in a communication system using multiple frequency bands where a system having backward compatibility is supported. The method includes receiving Packet Data Units (PDUs) over at least two frequency bands among the multiple frequency bands; and restoring a Service Data Unit (SDU) according to fragment information included in a header of each of the PDUs. The fragment information includes information indicating whether a corresponding PDU has been transmitted over at least two frequency bands, and a Band Fragment Sequence Number indicating an assembly order of the PDUs so that a reception side can restore the SDU when the corresponding PDU has been fragmented from the same SDU.

According to further another aspect of the present invention, there is provided a method for receiving data in a communication system using multiple frequency bands where a system having backward compatibility is supported. The method includes decrypting a wireless resource (MAP) allocated separately for each of the frequency bands to extract fragment information therefrom; and receiving Packet Data Units (PDUs) over the frequency bands separately, and restoring one Service Data Unit (SDU) according to fragment information corresponding to the corresponding frequency band.

According to yet another aspect of the present invention, there is provided an apparatus for transmitting data in a communication system using multiple frequency bands. The apparatus includes a fragmentation unit for fragmenting a desired transmission Service Data Unit (SDU) in units of Packet Data Units (PDUs); and a transmission unit for transmitting the fragmented PDUs over at least two frequency bands among the multiple frequency bands.

According to still another aspect of the present invention, there is provided an apparatus for receiving a packet in a communication system using multiple frequency bands where a system having backward compatibility is supported. The apparatus includes a reception unit for receiving Packet Data Units (PDUs) over at least two frequency bands among the multiple frequency bands; and a restoration unit for restoring a Service Data Unit (SDU) according to fragment information included in a header of each of the PDUs. The fragment information includes information indicating whether a corresponding PDU has been transmitted over at least two frequency bands, and a Band Fragment Sequence Number indicating an assembly order of the PDUs so that a reception side can restore the SDU when the corresponding PDU has been fragmented from the same SDU.

According to still another aspect of the present invention, there is provided an apparatus for receiving data in a communication system using multiple frequency bands where a system having backward compatibility is supported. The apparatus includes a MAP decryption unit for decrypting a wireless resource (MAP) allocated separately for each of the frequency bands to extract fragment information therefrom; and a restoration unit for receiving Packet Data Units (PDUs) over the frequency bands separately, and restoring one Service Data Unit (SDU) according to fragment information corresponding to the corresponding frequency band.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
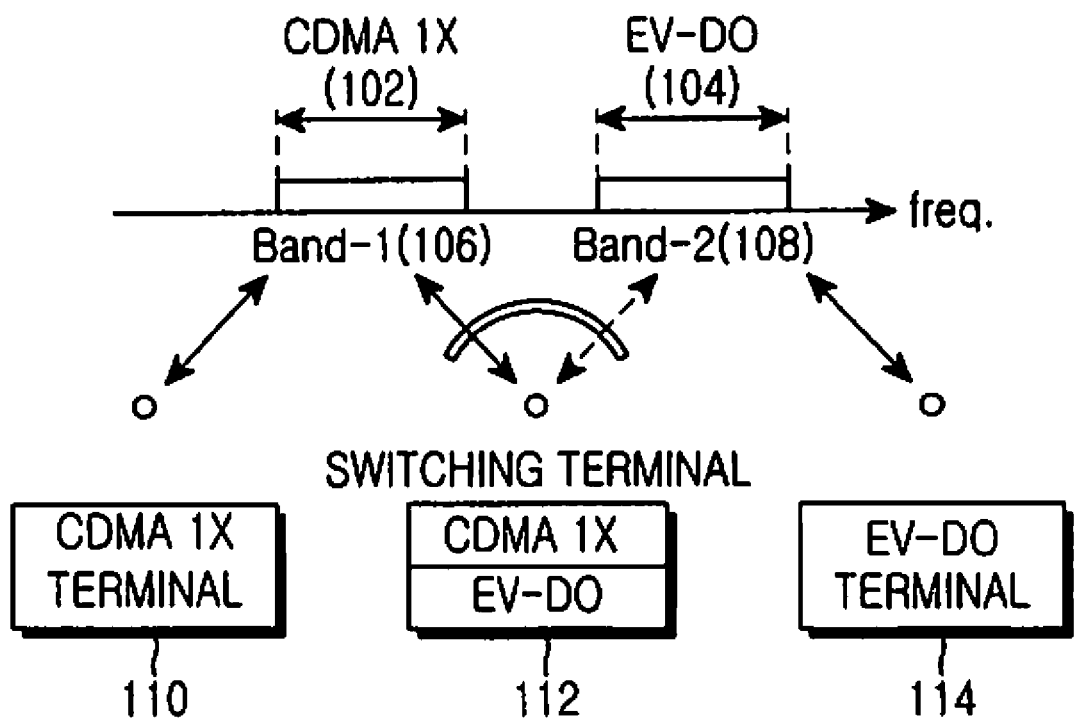
FIG. 1 is a diagram illustrating distribution of frequency bands of a CDMA 1× system and an EV-DO system in a communication system according to the prior art.
Figure 2:
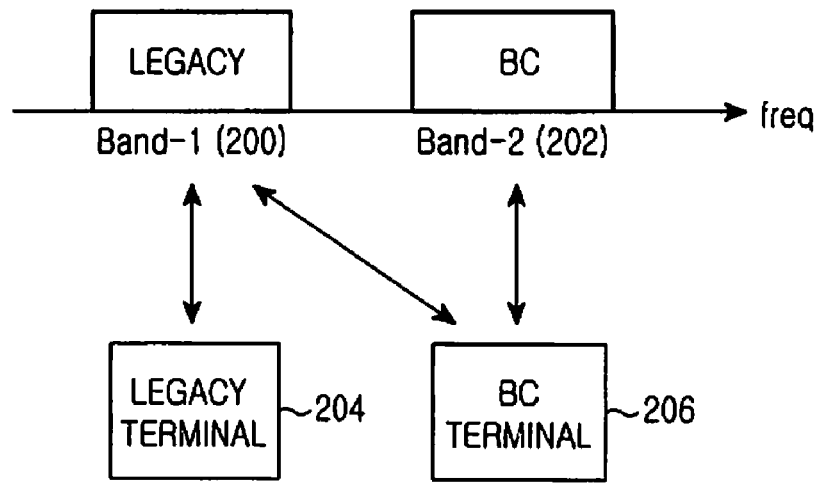
FIG. 2 is a diagram illustrating an example of frequency bands for multiple systems having backward compatibility according to the prior art.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Although a first embodiment of the present invention will be described with reference to an IEEE 802.16e communication system, by way of example, the present invention can be applied not only to the IEEE 802.16e communication system, but also to other communication systems.

Specifically, the communication system, to which the present invention is applicable, includes a transmission side and a reception side. The transmission side can be either a base station or a terminal, and the reception side can be either a terminal or a base station. For convenience, the transmission side will be limited herein to the base station. However, the present invention can be applied in the same way where the transmission side is a terminal.

Figure 6:
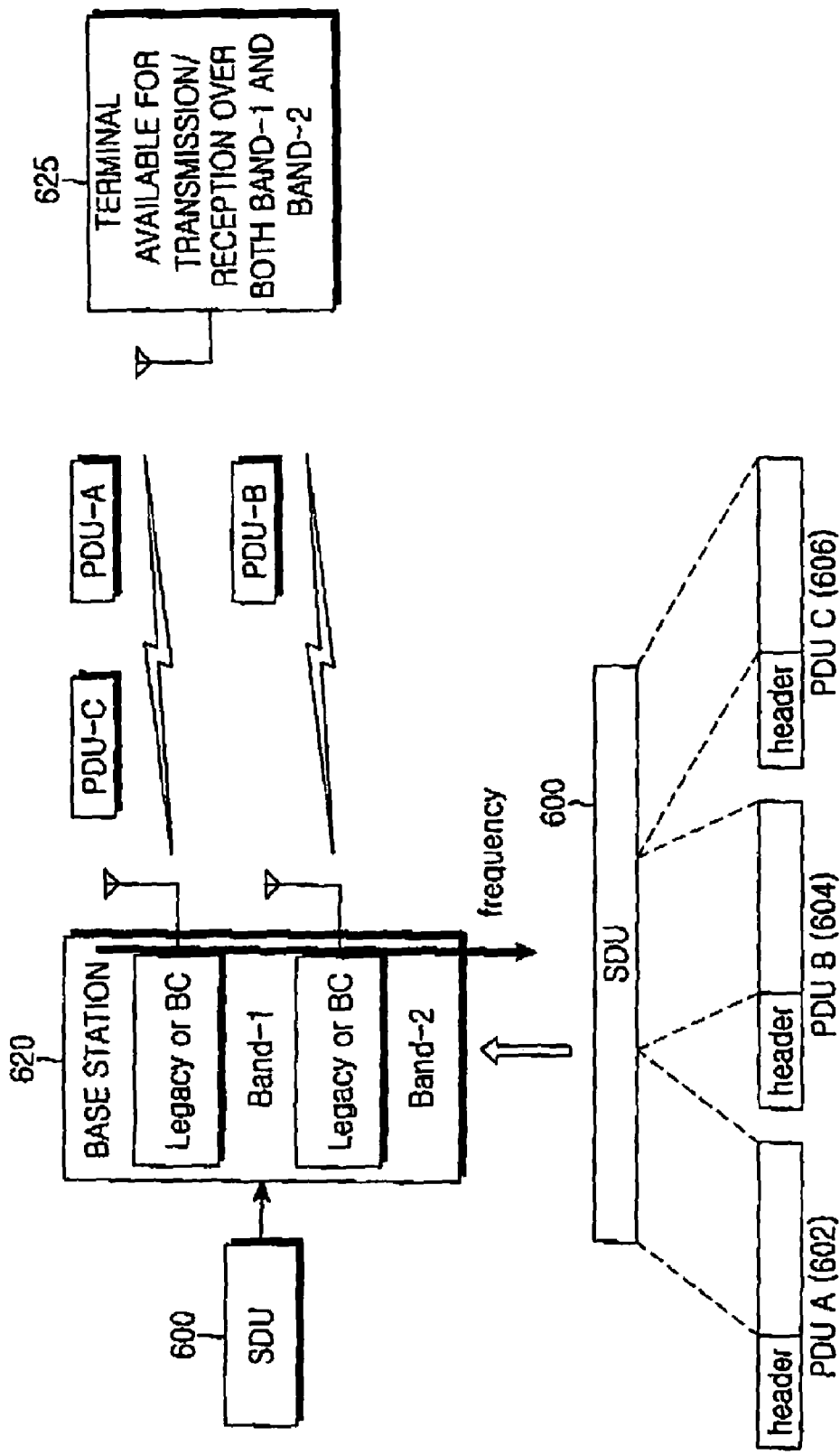
FIG. 6 is a diagram illustrating a scenario where a base station transmits PDUs fragmented from one SDU packet over different frequency bands separately according to a first embodiment of the present invention.

FIG. 6 illustrates a scenario where a base station transmits PDUs fragmented from one SDU packet over different frequency bands separately according to a first embodiment of the present invention. Herein, the systems supporting the bands can be diversified, where each of the frequency bands is operated by a plurality of systems, and each of the plurality of systems use the same air interface or different interface.

Referring to FIG. 6, a base station 620 and a terminal 625 use a band-1 and a band-2 as their frequency bands for packet transmission/reception. The base station 620, if it has an SDU 600 to transmit, fragments the SDU 600 in units of PDUs. That is, the SDU 600 is fragmented into 3 PDUs, i.e., PDU-A 602, PDU-B 604 and PDU-C 606. Thereafter, the base station 620 transmits the fragmented PDUs over the band-1 and the band-2 on a distributed basis. That is, the PDU-A 602 and the PDU-C 606 are transmitted to the terminal 625 over the band-1, and the PDU-B 604 is transmitted to the terminal 625 over the band-2.

In this case, the base station 620 determines corresponding bands for transmitting the fragmented PDUs taking into account a difference in the transmission mode and transmission efficiency between the standards of the corresponding systems supporting the band-1 and the band-2. Specifically, the base station 620 determines the amount of data to be transmitted over each band by comparing the desired amount of transmission data with the amount of data that the system standard supporting each band can transmit. For example, when the amount of data to be transmitted over the band-2 is greater than the transmission capability of the system supporting the band-2 and the amount of data to be transmitted over the band-1 is less than the transmission capability of the system supporting the band-1, the base station 620 determines to fragment a predetermined part of the data to be transmitted over the band-2 and to transmit the fragmented part over the band-1.

Figure 7:
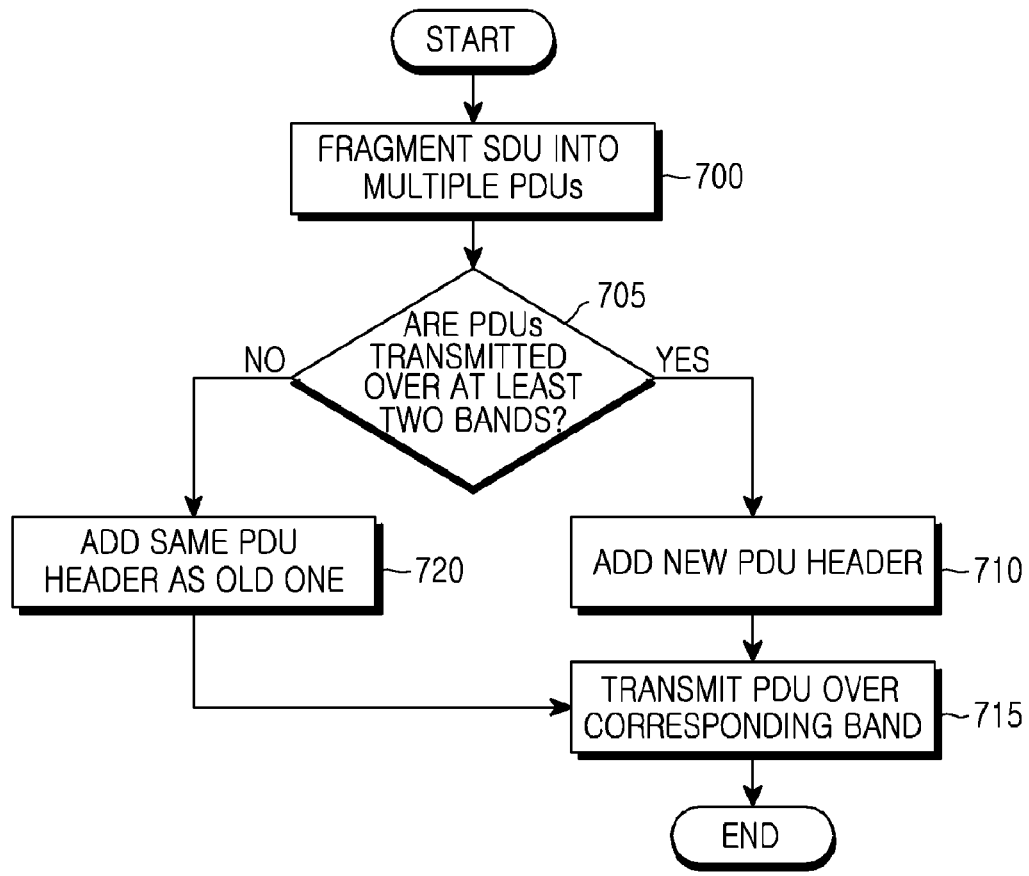
FIG. 7 is a diagram illustrating a packet transmission flow of a base station according to the first embodiment of the present invention.

FIG. 7 illustrates a packet transmission flow of a base station according to the first embodiment of the present invention. It is assumed herein that the base station uses multiple bands for data transmission/reception.

Referring to FIG. 7, in step 700, upon receipt of an SDU packet, the base station fragments the SDU into multiple PDUs. For the PDUs, their transmission bands are determined (selected) from among multiple bands according to the data transmission capabilities of the corresponding bands.

In step 705, the base station determines whether the fragmented PDUs are transmitted over at least two bands among the multiple bands on a distributed basis. If it is determined that the PDUs are transmitted over at least two bands in a distributed manner, the base station adds, in step 710, a new Medium Access Control (MAC) header indicating that the PDUs are PDUs fragmented such that they can be transmitted using multiple bands, and then proceeds to step 715. A detailed description of the MAC header will be given with reference to FIG. 8.

If it is determined that the PDUs are transmitted over only one of the multiple bands, the base station adds the same PDU header as the old one in step 720, and then proceeds to step 715. In step 715, the base station transmits the PDUs over the bands corresponding to the headers of the PDUs.

Figure 8:
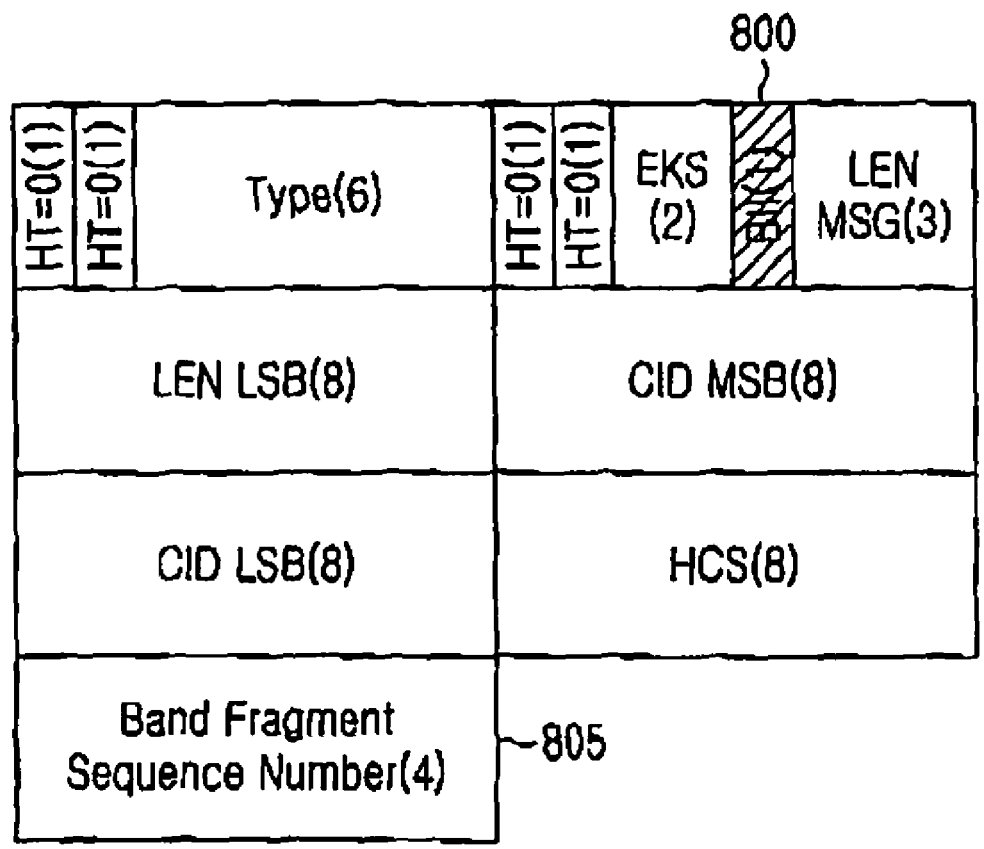
FIG. 8 is a diagram illustrating a header format of a MAC PDU according to the first embodiment of the present invention.

FIG. 8 illustrates a header format of a MAC PDU according to the first embodiment of the present invention.

Referring to FIG. 8, a 1-bit value of the existing reserved field of the MAC header is changed to a 1-bit value of a new Band Integrate Indicator (BII) 800. However, it would be obvious to those skilled in the art that the PDU header shown herein is a mere example for the IEEE 802.16 system, and is subject to change.

The BII bit 800, composed of 1 bit, indicates that an SDU of the corresponding PDU is fragmented into multiple PDUs and transmitted over multiple bands used by the base station. That is, the BII bit 800 provides the reception side with information indicating that the transmitted PDU packets should be assembled to restore the SDU. An assembly order for restoring the PDUs fragmented from the SDU at the reception side is indicated in a 4-bit 'Band Fragment Sequence Number' field 805.

Figure 9:
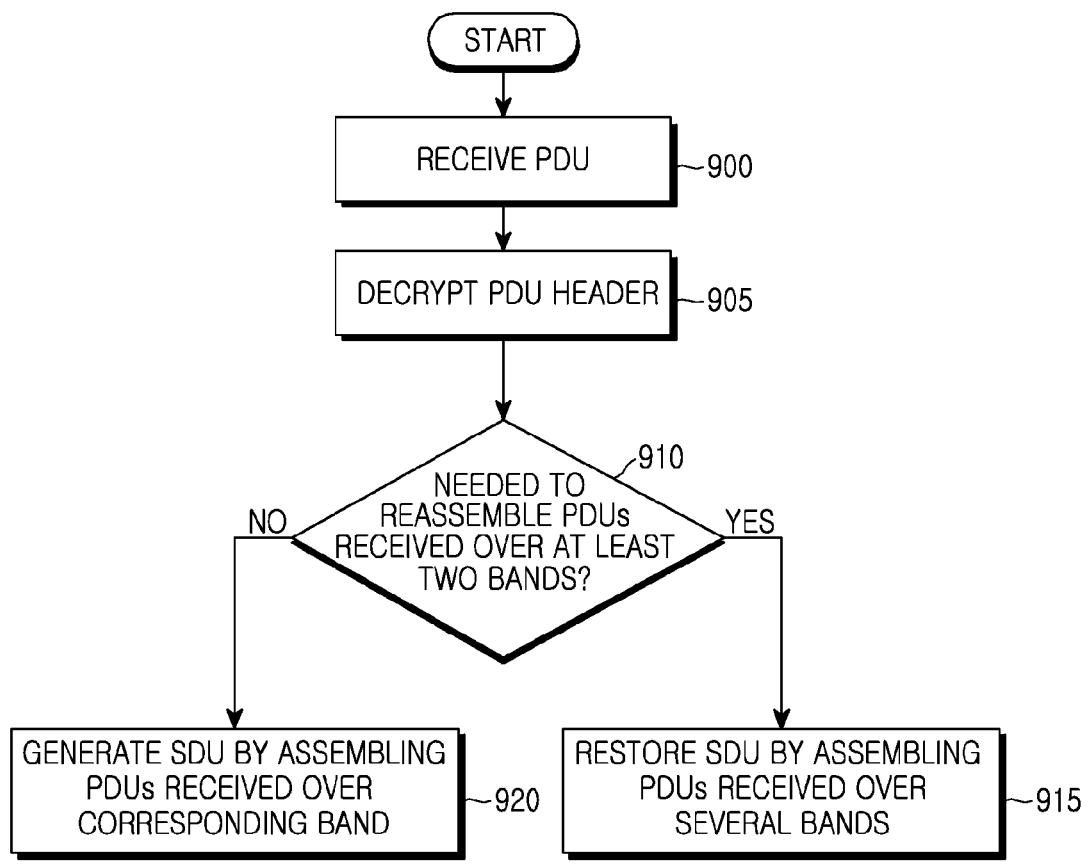
FIG. 9 is a diagram illustrating a packet reception flow of a terminal according to the first embodiment of the present invention.

FIG. 9 illustrates a packet reception flow of a terminal according to the first embodiment of the present invention.

Referring to FIG. 9, upon receiving a PDU packet(s) in step 900, the terminal decrypts a MAC header of the received PDU in step 905. If it is determined as a result of the MAC header decryption that the PDUs have been received over at least two bands, the terminal determines in step 910 whether it needs to reassemble the received PDUs. The terminal can determine whether it should reassemble the received PDUs, depending on the BII bit 800 in the MAC header of the corresponding PDU, shown in FIG. 8.

If it is determined that the PDUs received over at least two bands should be reassembled, the terminal assembles in step 915 the corresponding PDUs received from the multiple bands to restore the SDU. That is, if the BII bit in the MAC header is set to '1', the terminal restores the SDU packet by assembling PDUs with BII bit='1' among the received PDUs according to the assembly order indicated in the Band Fragment Sequence Number field.

However, if it is determined that the received PDUs do not need to be reassembled, the terminal generates in step 920 an SDU by assembling the PDUs received from the corresponding bands.

Figure 10:
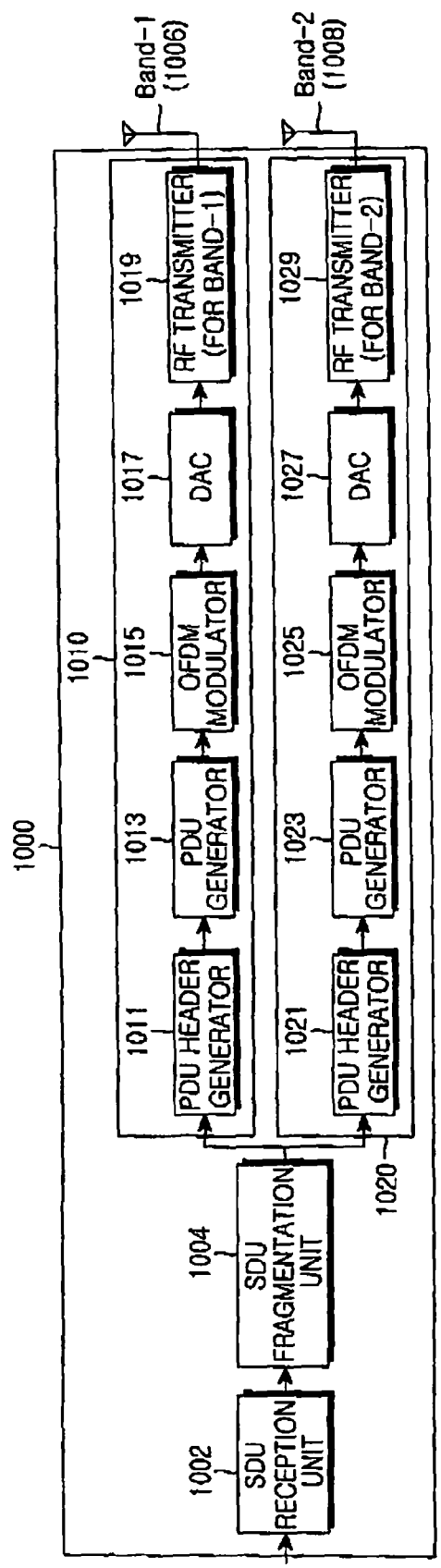
FIG. 10 is a diagram illustrating a structure of a transmitter according to the first embodiment of the present invention.

FIG. 10 illustrates a structure of a transmitter according to the first embodiment of the present invention. It will be assumed herein that the transmitter 1000 uses a band-1 and a band-2 as its operation frequency bands. However, it would be obvious to those skilled in the art that the present invention can be applied to other communication systems where more than 3 bands are used.

Referring to FIG. 10, the transmitter 1000 can be roughly divided into an SDU reception unit 1002, an SDU fragmentation unit 1004, a band-1 packet generator (or packet generator for the band-1) 1010, and a band-2 packet generator 1020 (or packet generator for the band-2) 1020.

The band-1 packet generator 1010 and the band-2 packet generator 1020 include PDU header generators (1011, 1021), PDU generators (1013, 1023), Orthogonal Frequency Division Multiplexing (OFDM) modulators (1015, 1025), Digital-to-Analog Converters (DACs) (1017, 1027), and Radio Frequency (RF) transmitters (1019, 1029), respectively, and are connected to their associated transmit antennas 1006 and 1008, respectively.

The SDU reception unit 1002, if it has a packet to transmit, generates an SDU by attaching an Internet Protocol (IP) header to the packet, and delivers the SDU to the SDU fragmentation unit 1004. The SDU fragmentation unit 1004 fragments the SDU into PDUs to be transmitted over the band-1 and the band-2 in a distributed way, and delivers the PDUs to the band-1 packet generator 1010 and the band-2 packet generator 1020 according to their associated bands. In this case, the criterion for distributing the fragmented PDUs to the bands can be determined taking into account the amount of data transmittable over the corresponding bands.

The band-1 packet generator 1010 and the band-2 packet generator 1020 similar in structure and operation, so a description of only the band-1 packet generator 1010 will be given herein for simplicity.

Upon receiving the fragmented PDUs from the SDU fragmentation unit 1004, the PDU header generator 10111 writes, in the BII bit 800 of the PDU header shown in FIG. 8, information indicating that PDUs fragmented from one SDU have been transmitted over multiple bands in a distributed way, also writes, in the Band Fragment Sequence Number field, the assembly order of the PDUs transmitted over the multiple bands, and delivers the PDU header to the PDU generator 1013.

The PDU generator 1013 generates a PDU(s) by attaching the generated PDU header and a Cyclic Redundancy Check (CRC) to the fragmented PDUs, and then delivers the PDUs to the OFDM modulator 1015.

The OFDM modulator 1015 OFDM-modulates the generated PDUs, and the DAC 1017 analog-converts the OFDM-modulated PDUs and delivers the analog-converted PDUs to the RF transmitter 1019. The RF transmitter 1019 RF-converts the PDUs and transmits the RF signal to a reception side via the transmit antenna 1006.

The packet transmitted over the band-2 is also generated according to the same procedure as that of the packet transmitted over the band-1.

Figure 11:
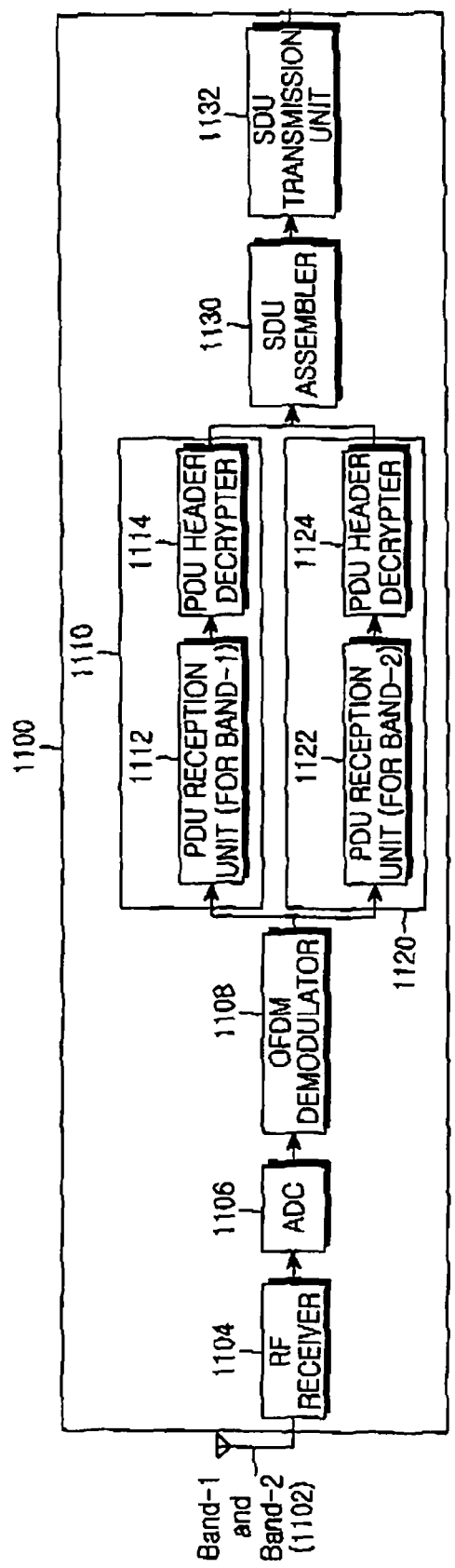
FIG. 11 is a diagram illustrating a structure of a receiver according to the first embodiment of the present invention.

FIG. 11 illustrates a structure of a receiver according to the first embodiment of the present invention. It is assumed herein that the receiver receives data over a band-1 and a band-2.

Referring to FIG. 11, the receiver 1100 includes a receive antenna 1102, an RF receiver 1104, an Analog-to-Digital Converter (ADC) 1106, an OFDM demodulator 1108, a band-1 reception unit (or reception unit for the band-1) 1110, a band-2 reception unit (or reception unit for the band-2) 1120, an SDU assembler 1130, and an SDU transmission unit 1132. The band-1 reception unit 1110 and the band-2 reception unit 1120 include band-1/2 PDU reception units (1112, 1122) and PDU header decryption units (1114, 1124), respectively.

The receive antenna 1102 receives a packet from the band-1 and the band-2, and delivers the received packet to the RF receiver 1104. The PDUs, which are delivered to the ADC 1106 by way of the RF receiver 1104, undergo analog to digital conversion and then undergo demodulation by means of the OFDM demodulator 1108. The demodulated PDUs are delivered to the band-1 reception unit 1110 and the band-2 reception unit 1120.

Upon receiving the PDUs via the band-1 PDU reception unit 1112, the PDU decryption unit 1114 delivers the received PDUs to the SDU assembler 1130, recognizing, based on the header of the PDUs, that the PDUs were received from multiple bands. Similarly, upon receiving the PDUs via the band-2 PDU reception unit 1122, the PDU decryption unit 1124 delivers the received PDUs to the SDU assembler 1130, recognizing, based on the header of the PDUs, that the PDUs were received from multiple bands. The SDU assembler 1130 assembles PDUs with BII bit='1' among the received PDUs into one SDU, and delivers the SDU to the SDU transmission unit 1132.

A second embodiment of the present invention provides a wireless resource allocation method and apparatus for transmitting fragment information of transmission data to a reception side when the communication system having backward compatibility with the legacy system uses multiple operation frequency bands.

Specifically, the base station fragments a desired transmission SDU in units of PDUs, and transmits each of the fragmented PDUs over the multiple operation frequency bands in a distributed manner. Here, the base station allocates wireless resources for transmission of the PDUs, along with fragment information of the PDUs. Although a description of the present invention will be directed herein to the DL_MAP(s) which is used as the wireless resource allocation information for the case where the base station serves as a transmission side, the same can be applied even to the UpLink MAPs (UL_MAPs) which is used as the wireless resource allocation information for the case where the base station serves as a reception side. The fragment information includes (i) information indicating that the corresponding PDU is a part of the SDU which was fragmented into PDUs associated with multiple operation frequency bands before transmission, (ii) information indicating whether the corresponding PDU belongs to the same data stream, and (iii) the assembly order. Thereafter, the terminal receives and assembles the fragmented packets according to the fragment information, and thereby restore the transmission data.

Figure 12:
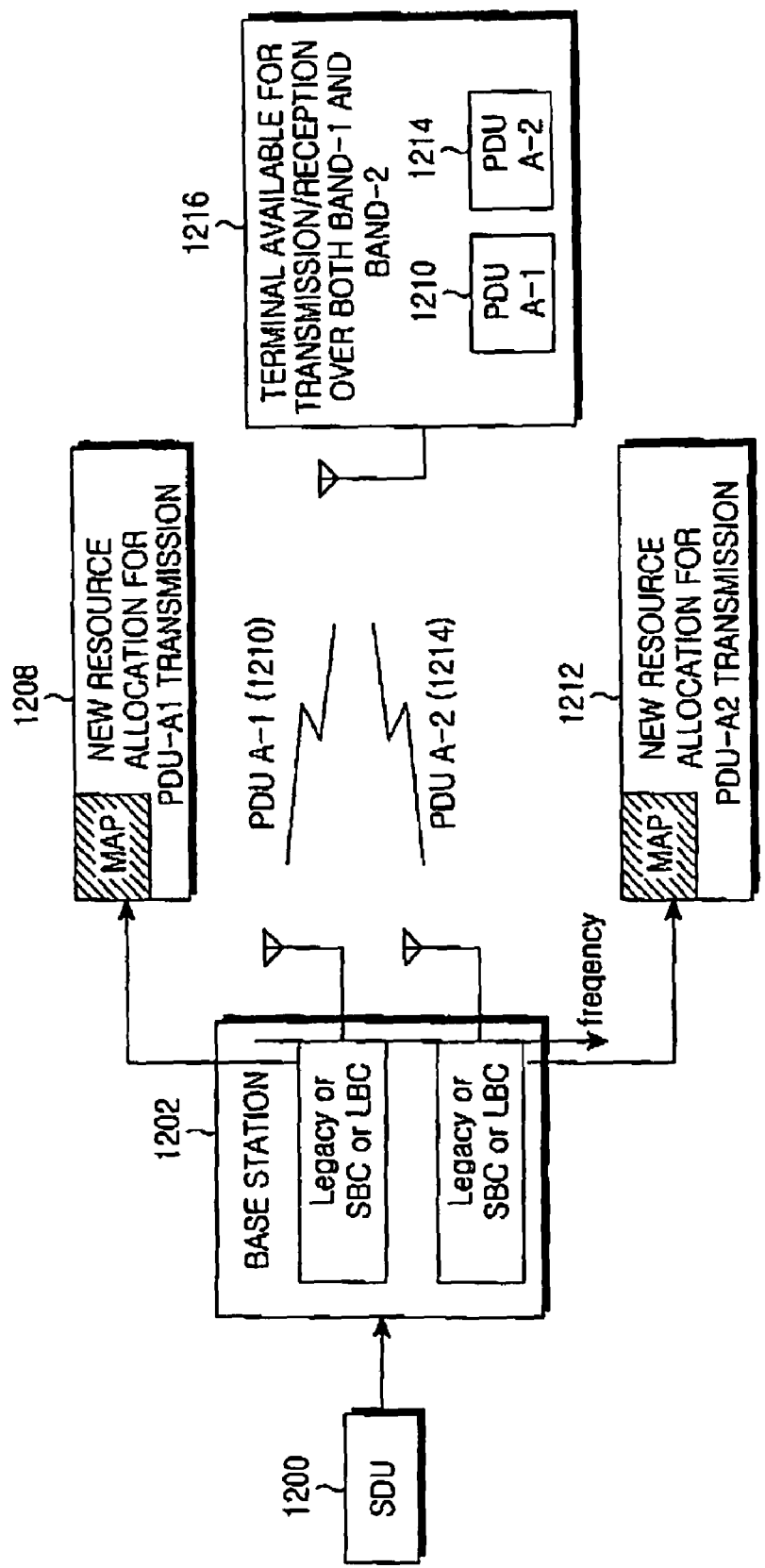
FIG. 12 is a diagram illustrating a method for transmitting fragmented data over different bands according to a second embodiment of the present invention.

FIG. 12 illustrates a method for transmitting fragmented data over different bands according to the second embodiment of the present invention.

Figure 3:
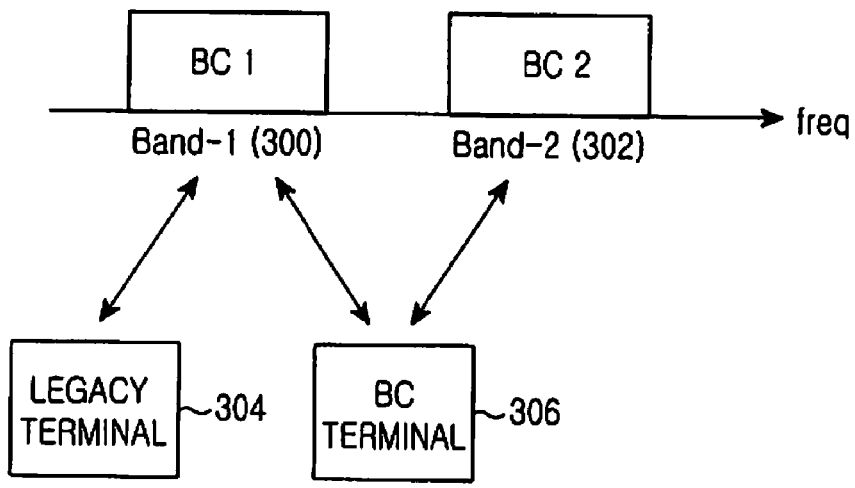
FIG. 3 is a diagram illustrating another example of frequency bands for multiple systems having backward compatibility according to the prior art.
Figure 4:
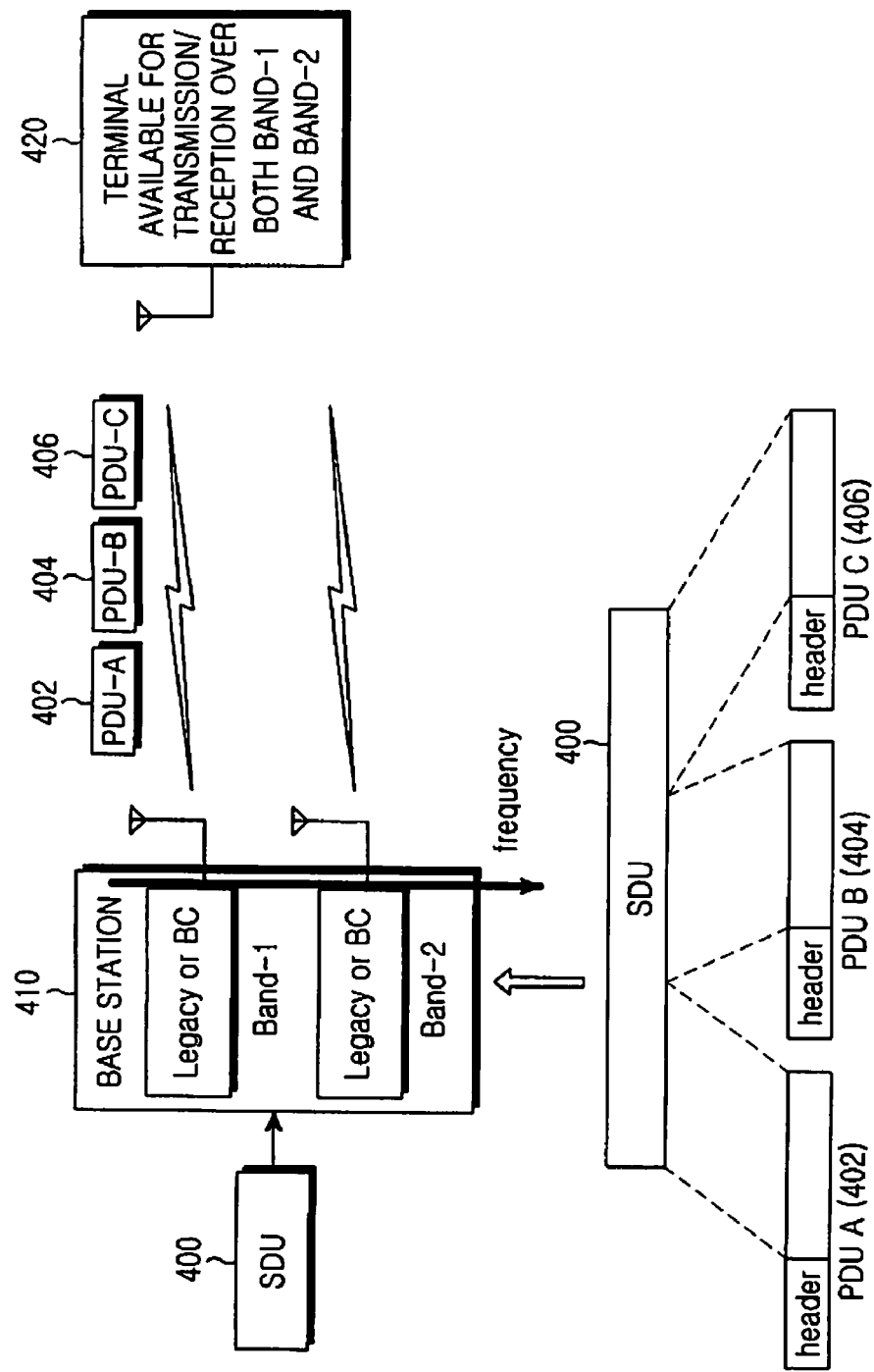
FIG. 4 is a diagram illustrating an operation in which multiple Packet Data Units (PDUs) fragmented from a Service Data Unit (SDU) packet are transmitted over the same band according to the prior art.
Figure 5:
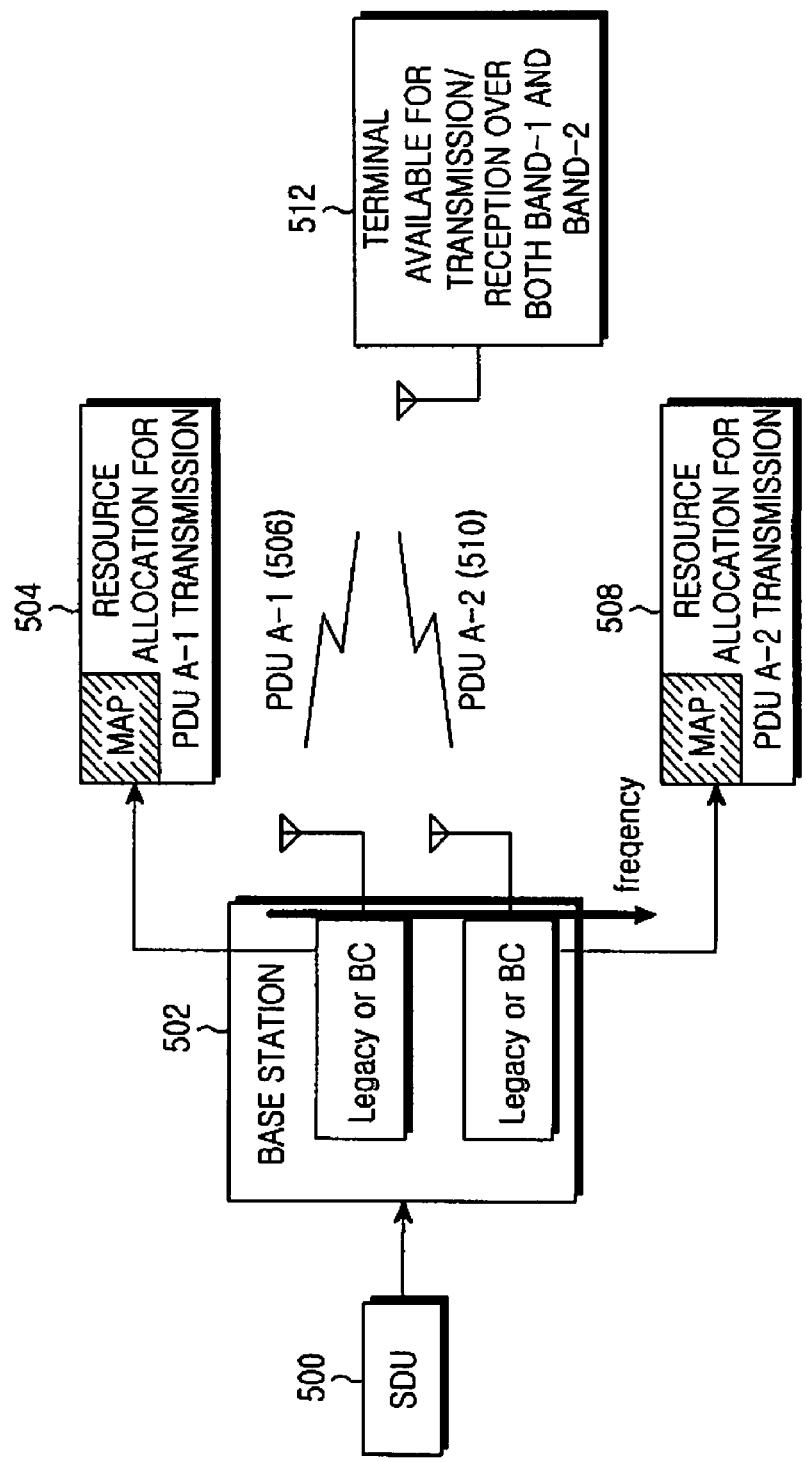
FIG. 5 is a diagram illustrating a method in which PDUs fragmented from one SDU are transmitted over different bands in multiple communication systems according to the prior art.

Referring to FIG. 12, a base station 1202 has a band-1 and a band-2 as its operation frequency bands, and a terminal 1216 can transmit/receive data over the band-1 and the band-2. The systems capable of supporting the band-1 and the band-2 are assumed to be the systems of FIG. 3.

To transmit a transmission SDU 1200 over the band-1 and the band-2, the base station 1202 fragments the SDU 1200 into a packet PDU A-1 1210 and a packet PDU A-2 1214, and allocates DL_MAP to each of the packet PDU A-1 1210 and the packet PDU A-2 1214. The DL_MAPs 1208 and 1212 include detailed fragment information of the packet PDU A-1 1210 and the packet PDU A-2 1214, respectively.

TABLE 1

| New_DL_MAP_IE | bits | Notes |
| --- | --- | --- |
| Extended-2 DIUC | 4 | |
| Length | 8 | Length in bytes |
| Band Fragment Sequence Number | 4 | Information indicating that SDU is fragmented separately for individual bands |
| DL_MAP_IE( ) | variable | DL_MAP_IE( ) standard of corresponding desired service band |

Table 1 shows an exemplary Information Element (IE) format of the DL_MAPs 1208 and 1212 including the fragment information.

Band Fragment Sequence Number and DL_MAP_IE( ) are newly added as the fragment information. The Band Fragment Sequence Number indicates, in a 4-bit form, (i) information indicating that the corresponding PDU is a packet fragmented from one SDU, (ii) information indicating whether the corresponding packet belongs to the same data stream, and (iii) the assembly order. The DL_MAP_IE( ) includes DL_MAP_IE( ) defined in the standard of the corresponding band. Table 1, given herein as a mere example, is subject to change.

TABLE 2

| New_UL_MAP_IE | bits | Notes |
| --- | --- | --- |
| Extended-2 DIUC | 4 | |
| Length | 8 | Length in bytes |
| Band Fragment Sequence Number | 4 | Information indicating that SDU is fragmented separately for individual bands |
| UL_MAP_IE( ) | variable | UL_MAP_IE( ) standard of corresponding desired service band |

Table 2 shows an exemplary format of UL_MAP_IEs 1208 and 1212 including fragment information. The fragment information includes Band Fragment Sequence Number and UL_MAP_IE( ). That is, Band Fragment Sequence Number indicates, in a 4-bit form, (i) information indicating that the corresponding PDU is a PDU fragmented from one SDU, (ii) information indicating whether the corresponding PDU belongs to the same data stream, and (iii) the assembly order. The UL_MAP_IE( ) includes UL_MAP_IE( ) defined in the standard of the corresponding band.

Table 2, given herein as an example, is subject to change. The UL_MAP_IE configured as shown in Table 2 is allocated during data transmission from the terminal to the base station, and there is no difference in operation between the UL_MAP_IE and the DL_MAP_IE except for the exchange of their roles between the terminal and the base station, so a detailed description will be omitted herein for simplicity.

Figure 13:
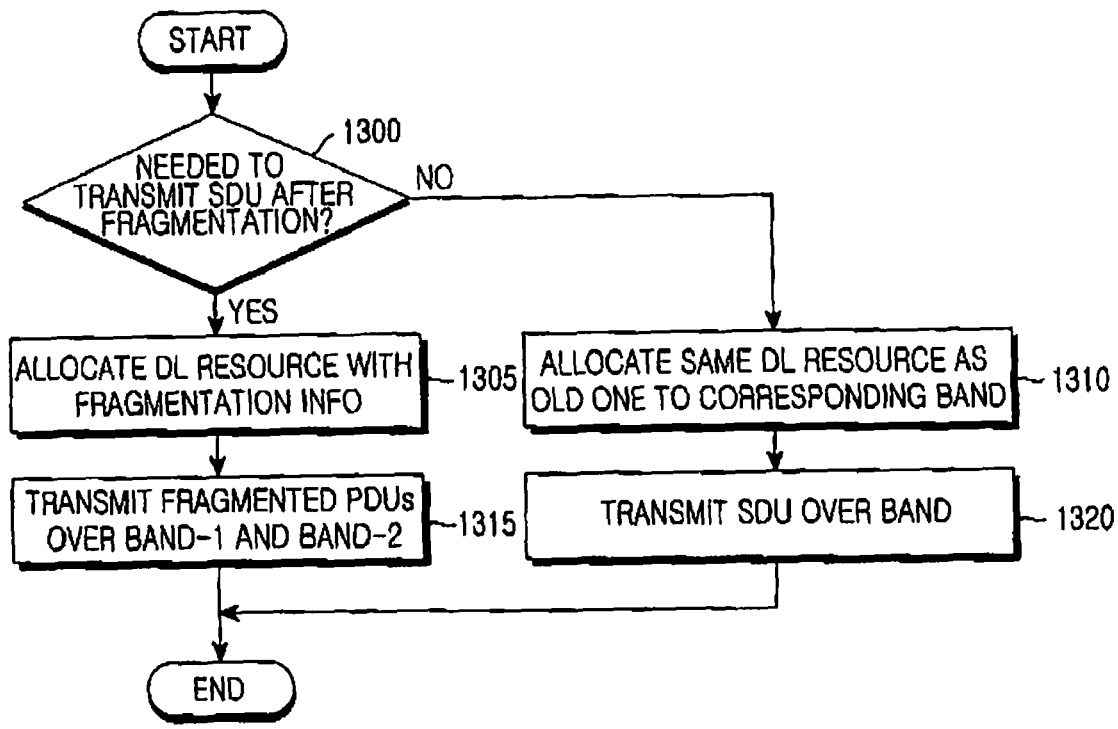
FIG. 13 is a diagram illustrating a transmission operation of a base station according to the second embodiment of the present invention.

FIG. 13 illustrates a transmission operation of a base station according to the second embodiment of the present invention. It will be assumed herein that the base station uses a band-1 and a band-2 as its operation frequency bands.

Referring to FIG. 13, if there is a transmission SDU, the base station determines in step 1300 whether it will transmit the SDU over the band-1 and the band-2 after fragmentation. The fragmentation of the SDU is determined herein taking into account the difference in the transmission mode and the transmission efficiency between the standards of systems supporting the corresponding bands.

When the base station determines to fragment the transmission SDU into 2 PDUs and transmit them over the band-1 and the band-2 in a distributed manner, the base station allocates, in step 1305, DL resources including the fragment information shown in Table 1 for each of the band-1 and the band-2. Thereafter, in step 1315, the base station transmits the fragmented PDUs over the DL resources allocated to the band-1 and the band-2.

However, when the base station determines to transmit the transmission SDU over only one band, the base station allocates, in step 1310, DL resources including the same DL_MAP_IE as the conventional one. Thereafter, in step 1320, the base station transmits the SDU over the corresponding band.

Figure 14:
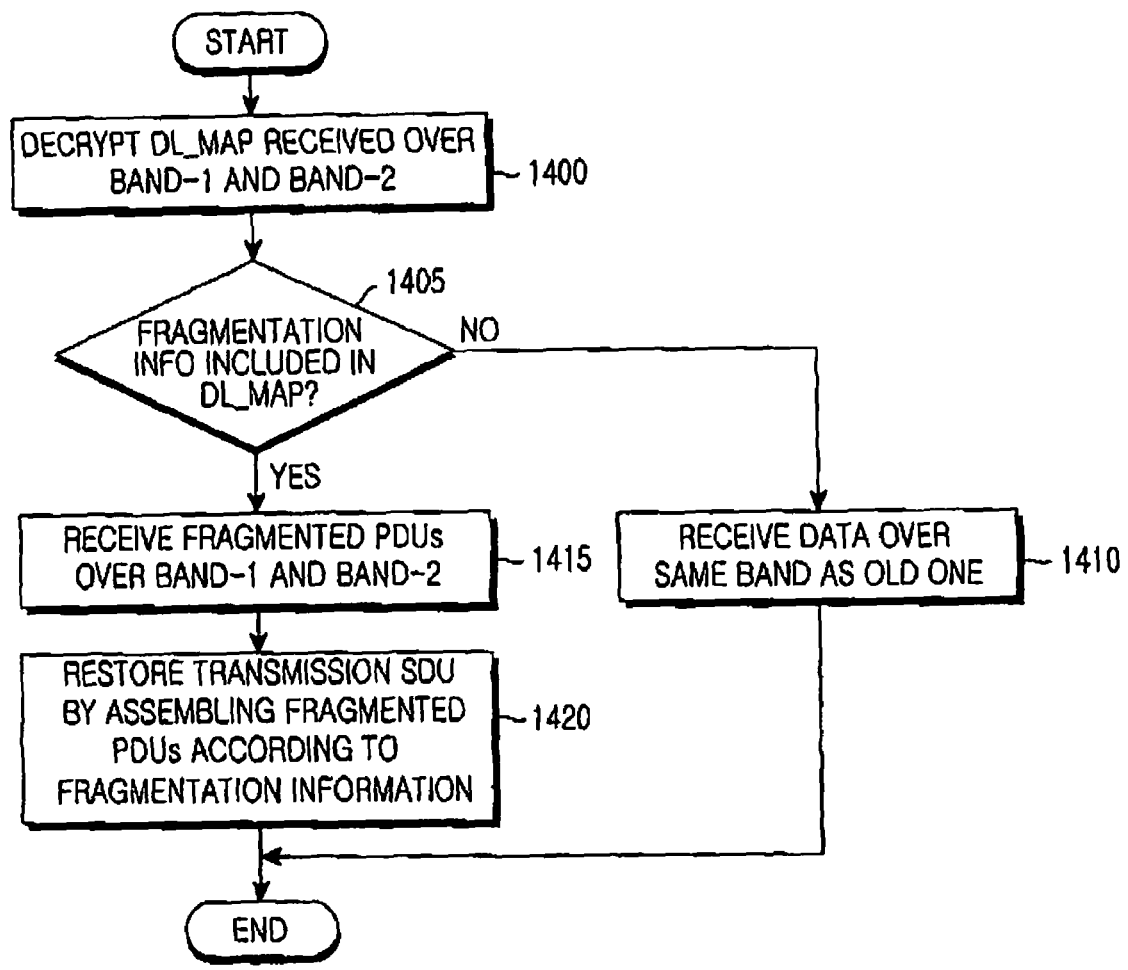
FIG. 14 is a diagram illustrating a reception operation of a terminal according to the second embodiment of the present invention.

FIG. 14 illustrates a reception operation of a terminal according to the second embodiment of the present invention. Herein, the terminal can decrypt the signals received over both a band-1 and a band-2.

In step 1400, the terminal decrypts DL_MAPs received over both the band-1 and the band-2. Based on the decryption result, the terminal determines in step 1405 whether fragment information is included in the received DL_MAPs. If it is determined that the fragment information is included in the DL_MAPs, the terminal receives PDUs over the band-1 and the band-2 in step 1415.

Thereafter, in step 1420, the terminal restores the original SDU transmitted by the base station by assembling the received PDUs according to the fragment information. Herein, the fragment information includes (i) information indicating whether the corresponding packet was fragmented from the same data, and (ii) the assembly order.

However, if it is determined that no fragment information is included in the received DL_MAPs, i.e., if the same DL_MAPs as the conventional ones are allocated in the band-1 and the band-2, the terminal receives data over the corresponding resource allocation region in step 1410.

Figure 15:
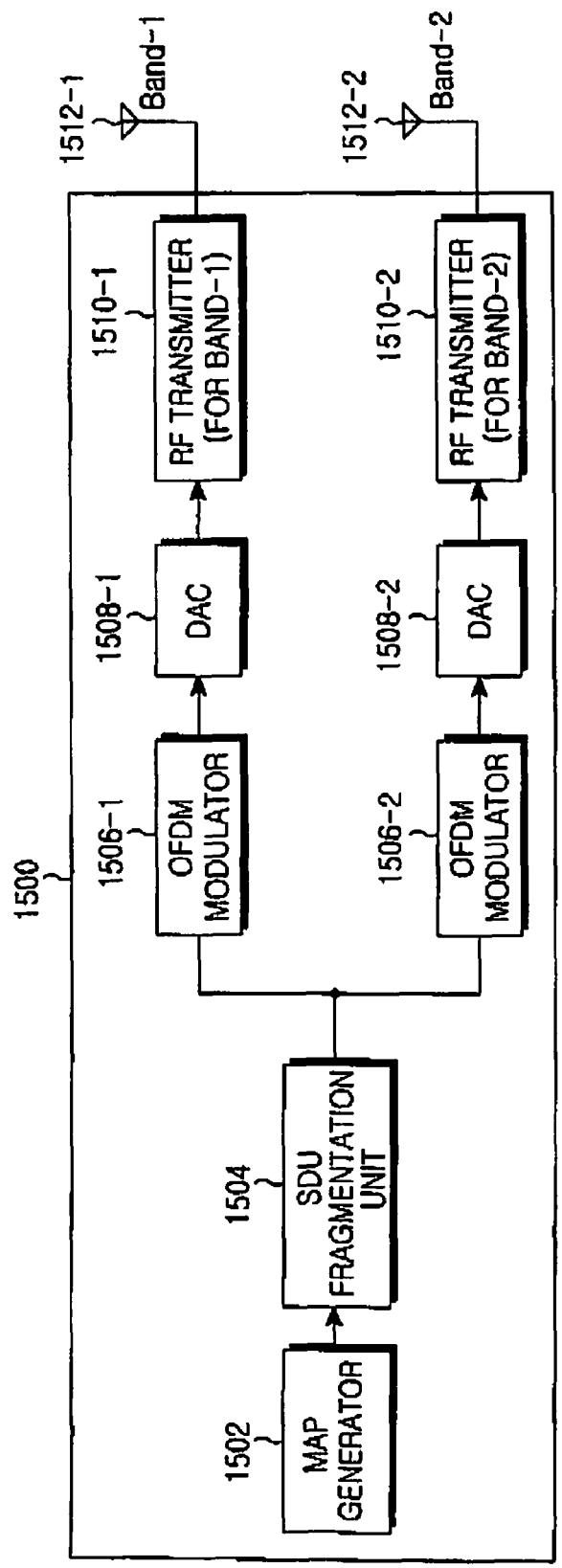
FIG. 15 is a diagram illustrating a structure of a base station according to the second embodiment of the present invention.

FIG. 15 illustrates a structure of a base station according to the second embodiment of the present invention. Although a base station 1500 is assumed herein to use a band-1 and a band-2 as its operation frequency bands, it would be obvious to those skilled in the art that the present invention can be applied to other communication systems where 3 or more bands are used.

Referring to FIG. 15, the base station 1500 includes a MAP generator 1502, an SDU fragmentation unit 1504, a band-1 OFDM modulator (or OFDM modulator for the band-1) 1506-1, a band-2 OFDM modulator (or OFDM modulator for the band-2) 1506-2, Digital-to-Analog Converters (DACs) 1508-1 and 1508-2, a band-1 RF transmitter (or RF transmitter for the band 1) 1510-1, a band-2 RF transmitter (or RF transmitter for the band 2) 1510-2, and antennas 1512-1 and 1512-2.

When the base station 1500 has an SDU to transmit, the MAP generator 1502 generates a DL_MAP, which is wireless resource for transmission of the transmission data, and transfers the generated DL_MAP to the SDU fragmentation unit 1504.

The SDU fragmentation unit 1504 determines whether to fragment the transmission data. The fragmentation of the transmission data is determined taking into account the difference in the transmission mode and the transmission efficiency between the standards of the corresponding systems. When the SDU fragmentation unit 1504 determines to fragment the transmission SDU into 2 PDUs and transmit them over the band-1 and the band-2 in a distributed way, the MAP generator 1502 generates DL_MAPs including the fragment information and allocates them to the band-1 and the band-2.

Operations of the OFDM modulators (1506-1, 1506-2), the DACs (1508-1, 1508-2), the RF transmitters (1510-1, 1510-

2) and the antennas (1512-1, 1512-2), associated with the band-1 and the band-2, after allocating the DL_MAPs for data transmission are equal to the conventional operations, so a detailed description thereof will be omitted herein for simplicity.

Figure 16:
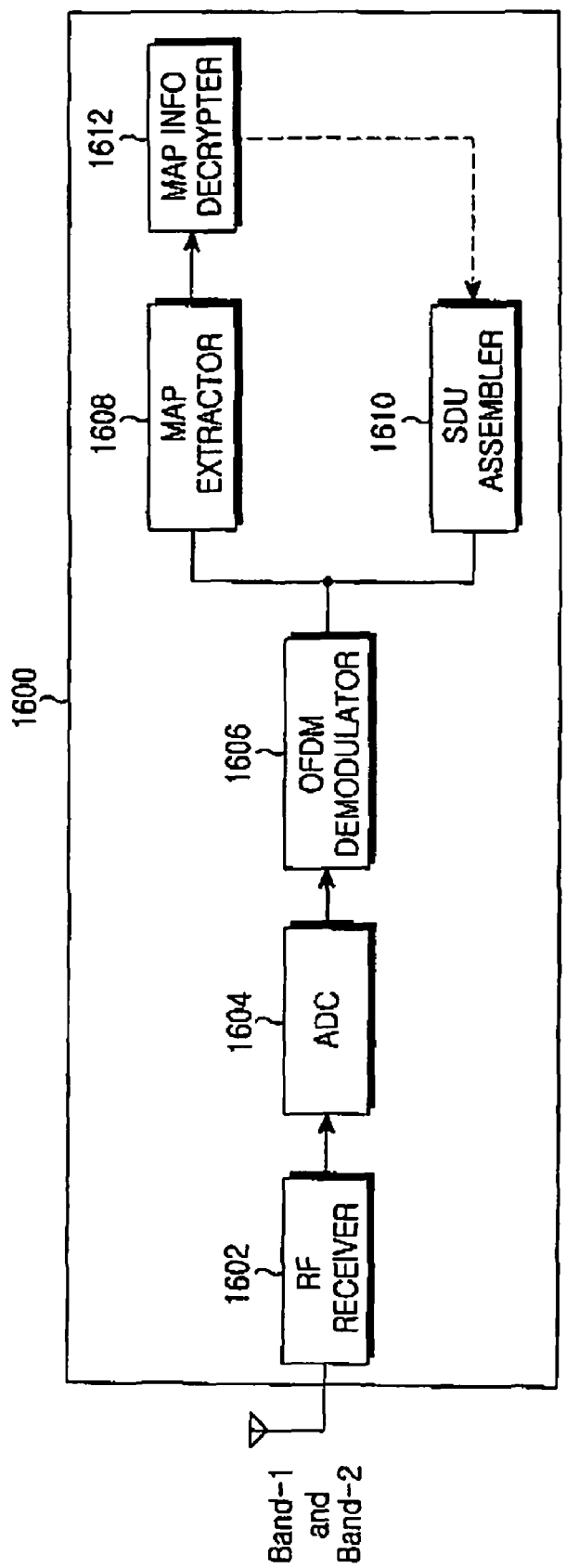
FIG. 16 is a diagram illustrating a structure of a terminal according to the second embodiment of the present invention.

FIG. 16 illustrates a structure of a terminal according to the second embodiment of the present invention. Herein, a terminal 1600 can transmit/receive data over a band-1 and a band-2.

Referring to FIG. 16, the terminal 1600 includes an RF receiver 1602, a Analog-to-Digital Converter (ADC) 1604, an OFDM demodulator 1606, a MAP extractor 1608, a data assembler 1610, and a MAP information decrypter 1612.

The RF receiver 1602 receives an SDU from the transmission side, and digital-converts the received SDU by means of the ADC 1604. The digital-converted SDU is delivered to the MAP extractor 1608 by way of the OFDM demodulator 1606. The MAP extractor 1608 extracts fragment information from the DL_MAP allocated to the corresponding band over which the PDU is received, and delivers the extracted fragment information to the MAP information decrypter 1612. The MAP information decrypter 1612 analyzes the fragment information to determine whether the corresponding packet has been fragmented from the same data stream, and when the corresponding packet has been fragmented from the same SDU, the MAP information decrypter 1612 checks the assembly order for restoration of the SDU, and delivers the assembly order information to the data assembler 1610.

The data assembler 1610 restores the SDU by assembling the PDUs received over the band-1 and the band-2 according to the assembly order.

As is apparent from the foregoing description, when there are systems supporting multiple standards, the present invention transmits one desired transmission packet using all the operation frequency bands of the multiple standards, making it possible not only to efficiently use the resources, but also to transmit data using the standards suitable for the frequency efficiency according to the data type. In addition, in the process of fragmenting transmission data into multiple packets and transmitting/receiving the packets over different bands on a distributed basis, the base station transmits to the reception side the fragment information indicating that it transmits the transmission data over the different bands in a distributed way, thereby enabling inter-band resource sharing and allowing the reception side to restore the original transmission data by assembling the fragmented packets.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a communication system using multiple frequency bands, the method comprising:
    fragmenting a desired transmission Service Data Unit (SDU) in units of Packet Data Units (PDUs);
    comparing a size of the fragmented PDU with an amount of data supported in each of the multiple frequency bands, and determining, depending on the comparison result; at least two frequency bands over which the corresponding PDUs will be transmitted among the multiple frequency bands; and
    transmitting the fragmented PDUs over at least two frequency bands among the multiple frequency bands.

2. The method of claim 1, wherein each of the multiple frequency bands is operated by a plurality of systems, and each of the plurality of systems use the same air interface or different interface.

3. The method of claim 2, wherein transmitting further comprises:
    when it is determined to transmit the PDUs over at least two frequency bands among the multiple frequency bands, generating a header separately for each of the PDUs, wherein the header includes a first fragment information indicating the determination, and a Band Fragment Sequence Number indicating an assembly order of the PDUs so that a reception side can restore the SDU; and
    attaching the generated header to each of the PDUs corresponding to the header, and transmitting the PDUs over the determined frequency band.

4. The method of claim 2, further comprises:
    comparing a size of the fragmented PDU with an amount of data supported in each of the multiple frequency bands, and determining at least two frequency bands over which the corresponding PDUs will be transmitted;
    allocating a MAP separately for each of the multiple frequency bands, wherein the MAP includes information indicating that each of the PDUs is a part of the SDU, information indicating whether the corresponding PDU belongs to the same data stream, and a Band Fragment Sequence Number indicating an assembly order of the PDUs so that a reception side can restore the SDU;
    transmitting the MAP corresponding to at least two of the determined frequency bands; and
    after transmission of the MAP corresponding to at least two of the determined frequency bands, transmitting each of the fragmented PDUs over at least two of the determined frequency band.

5. A method for receiving a packet in a communication system using multiple frequency bands where each of the multiple frequency bands is operated by a plurality of systems, and each of the plurality of systems use the same air interface or different interface, the method comprising:
    receiving Packet Data Units (PDUs) over at least two frequency bands among the multiple frequency bands, wherein at least two frequency bands are determined by comparing a size of the PDU with an amount of data supported by each of the multiple frequency bands, depending on the comparison result; and
    restoring a Service Data Unit (SDU) according to fragment information included in a header of each of the PDUs wherein the fragment information includes information indicating whether a corresponding PDU has been transmitted over at least two frequency bands, and a Band Fragment Sequence Number indicating an assembly order of the PDUs so that a reception side can restore the SDU when the corresponding PDU has been fragmented from the same SDU.

6. A method for receiving data in a communication system using multiple frequency bands where each of the multiple frequency bands is operated by a plurality of systems, and each of the plurality of systems use the same air interface or different interface, the method comprising:
    decrypting a wireless resource (MAP) allocated separately for each of the frequency bands to extract fragment information therefrom; and
    receiving Packet Data Units (PDUs) over the frequency bands separately, and restoring one Service Data Unit (SDU) according to fragment information corresponding to the corresponding frequency band, wherein the frequency bands are determined depending on the comparison result of sizes of the PDUs with amount of data supported by each frequency band.

7. The method of claim 6, wherein the fragment information comprises information indicating that the PDU is fragmented from the SDU, information indicating whether the corresponding PDU belongs to the same data stream, and an assembly order.

8. The method of claim 7, wherein restoring further comprises:
when the fragment information of the corresponding PDU indicates that the corresponding PDU is fragmented from one SDU, restoring the SDU according to the assembly order by assembling the PDUs having the same data stream as the PDU.

9. An apparatus for transmitting data in a communication system using multiple frequency bands, the apparatus comprising:
a determiner for determining at least two frequency bands, depending on a comparison result, by comparing a size of a Packet Data Unit (PDU) with an amount of data supported to each of the multiple frequency bands;
a fragmentation unit for fragmenting a desired transmission Service Data Unit (SDU) in units of PDUs; and
a transmission unit for transmitting the fragmented PDUs over at least two frequency bands among the multiple frequency bands.

10. The apparatus of claim 9, wherein each of the multiple frequency bands is operated by a plurality of systems, and each of the plurality of systems use the same air interface or different interface.

11. The apparatus of claim 9, wherein the transmission unit compares a size of the PDU with an amount of data supported in each of the multiple frequency bands, and determines at least two frequency bands over which the corresponding PDUs will be transmitted among the multiple frequency bands, depending on the comparison result.

12. The apparatus of claim 9, wherein when it is determined to transmit the PDUs over at least two frequency bands among the multiple frequency bands, the transmission unit generates a header separately for each of the PDUs, wherein the header includes a first fragment information indicating the determination, and a Band Fragment Sequence Number indicating an assembly order of the PDUs so that a reception side can restore the SDU,
attaches the generated header to each of the PDUs corresponding to the header, and transmits the PDUs over the determined frequency band.

13. The apparatus of claim 9, wherein the fragmentation unit comprises:
a MAP allocator for allocating a MAP separately for each of the multiple frequency bands, wherein the MAP includes information indicating that each of the PDUs is a part of the SDU, information indicating whether the corresponding PDU belongs to the same data stream, and a Band Fragment Sequence Number indicating an assembly order of the PDUs so that a reception side can restore the SDU; and
a transmission unit for transmitting the allocated MAP corresponding to the at least two frequency bands, and transmitting each of the fragmented PDUs over at two least frequency band.

14. An apparatus for receiving a packet in a communication system using multiple frequency bands where each of the multiple frequency bands is operated by a plurality of systems, and each of the plurality of systems use the same air interface or different interface, the apparatus comprising:
a reception unit for receiving Packet Data Units (PDUs) over at least two frequency bands among the multiple frequency bands, wherein the frequency hands are determined by comparing a size of the PDU with an amount of data supported, depending on the comparison result; and
a restoration unit for restoring a Service Data Unit (SDU) according to fragment information included in a header of each of the PDUs;
wherein the fragment information includes information indicating whether a corresponding PDU has been transmitted over at least two frequency bands, and a Band Fragment Sequence Number indicating an assembly order of the PDUs so that a reception side can restore the SDU when the corresponding PDU has been fragmented from the same SDU.

15. An apparatus for receiving data in a communication system using multiple frequency bands where each of the multiple frequency bands is operated by a plurality of systems, and each of the plurality of systems use the same air interface or a different interface, the apparatus comprising:
a MAP decryption unit for decrypting a wireless resource (MAP) allocated separately for each of the frequency bands to extract fragment information therefrom; and
a restoration unit for receiving Packet Data Units (PDUs) over the frequency bands separately, and restoring one Service Data Unit (SDU) according to fragment information corresponding to the corresponding frequency band, wherein the frequency bands are determined depending on the comparison result of sizes of the PDUs with amount of data supported by each frequency band.

16. The apparatus of claim 15, wherein the fragment information includes information indicating that the PDU is fragmented from the SDU, information indicating whether the corresponding PDU belongs to the same data stream, and an assembly order.

17. The apparatus of claim 16, wherein when the fragment information of the corresponding PDU indicates that the corresponding PDU is fragmented from the SDU, and the restoration unit restores the SDU according to the assembly order by assembling the PDUs having the same data stream as the PDU.

* * * * *